(12) United States Patent
Schaferlein et al.

(10) Patent No.: US 11,697,494 B2
(45) Date of Patent: Jul. 11, 2023

(54) AIRCRAFT

(71) Applicant: Volocopter GmbH, Bruchsal (DE)

(72) Inventors: Ulrich Schaferlein, Stuttgart (DE); Manuel Kessler, Kirchheim (DE)

(73) Assignee: Volocopter GmbH, Bruchsal (DE)

( * ) Notice: Subject to any disclaimer, the term of this patent is extended or adjusted under 35 U.S.C. 154(b) by 599 days.

(21) Appl. No.: 16/722,482

(22) Filed: Dec. 20, 2019

(65) Prior Publication Data

US 2020/0398981 A1    Dec. 24, 2020

(30) Foreign Application Priority Data

Dec. 20, 2018  (DE) .......................... 102018133171.1

(51) Int. Cl.
| | | |
|---|---|---|
| B64C 29/00 | (2006.01) | |
| B64C 5/02 | (2006.01) | |
| B64C 5/06 | (2006.01) | |
| B64C 5/10 | (2006.01) | |
| B64C 9/00 | (2006.01) | |
| B64C 13/04 | (2006.01) | |
| B64D 27/24 | (2006.01) | |
| B64D 41/00 | (2006.01) | |
| B64C 27/08 | (2023.01) | |

(52) U.S. Cl.
CPC ............ *B64C 29/0025* (2013.01); *B64C 5/02* (2013.01); *B64C 5/06* (2013.01); *B64C 5/10* (2013.01); *B64C 9/00* (2013.01); *B64C 13/04* (2013.01); *B64C 27/08* (2013.01); *B64D 27/24* (2013.01); *B64D 41/00* (2013.01)

(58) Field of Classification Search
CPC .... B64C 5/02; B64C 5/06; B64C 5/10; B64C 2027/8263; B64C 2027/8272; B64C 2027/8281; B64C 39/04
See application file for complete search history.

(56) References Cited

U.S. PATENT DOCUMENTS

| | | | |
|---|---|---|---|
| 9,120,560 B1 * | 9/2015 | Armer | ................. B64C 29/0025 |
| 9,663,237 B2 | 5/2017 | Senkel et al. | |
| 10,189,565 B2 * | 1/2019 | Patterson | ............. B64C 29/0033 |
| 10,501,173 B1 * | 12/2019 | Douglas | .................... B64C 9/00 |
| 11,332,239 B2 * | 5/2022 | Tian | ........................ B64C 39/04 |
| 11,447,246 B2 * | 9/2022 | Kunz | ..................... B64U 10/10 |
| 2016/0031554 A1 | 2/2016 | Eshkenazy et al. | |
| 2016/0129998 A1 | 5/2016 | Welsh et al. | |
| 2016/0207625 A1 | 7/2016 | Judas et al. | |
| 2017/0283048 A1 | 10/2017 | Beckman et al. | |
| 2017/0300066 A1 * | 10/2017 | Douglas | ............... G05D 1/0816 |

(Continued)

FOREIGN PATENT DOCUMENTS

| | | |
|---|---|---|
| DE | 102012202698 | 8/2013 |
| JP | 2016215958 | 12/2016 |

*Primary Examiner* — Philip J Bonzell
*Assistant Examiner* — Michael B. Kreiner
(74) *Attorney, Agent, or Firm* — Volpe Koenig

(57) ABSTRACT

An aircraft in the form of an electrically driven, vertical take-off and landing, preferably people-carrying and/or load-carrying multicopter (1) is provided, in which a multiplicity of rotors are arranged in a common rotor plane (R), in which a tail unit (6), protruding upward or downward with respect to the rotor plane (R), is provided above or below the rotor plane (R), preferably in a rear region of the aircraft (1) with respect to a forward flying direction.

11 Claims, 6 Drawing Sheets

(56) References Cited

U.S. PATENT DOCUMENTS

2019/0127056 A1* 5/2019 Weekes .................. B64C 39/12
2019/0270516 A1* 9/2019 Sinusas .................. B64C 27/20
2019/0291860 A1* 9/2019 Morgan ................. B64C 27/30
2020/0407055 A1* 12/2020 Mores .................. B64C 39/068

* cited by examiner

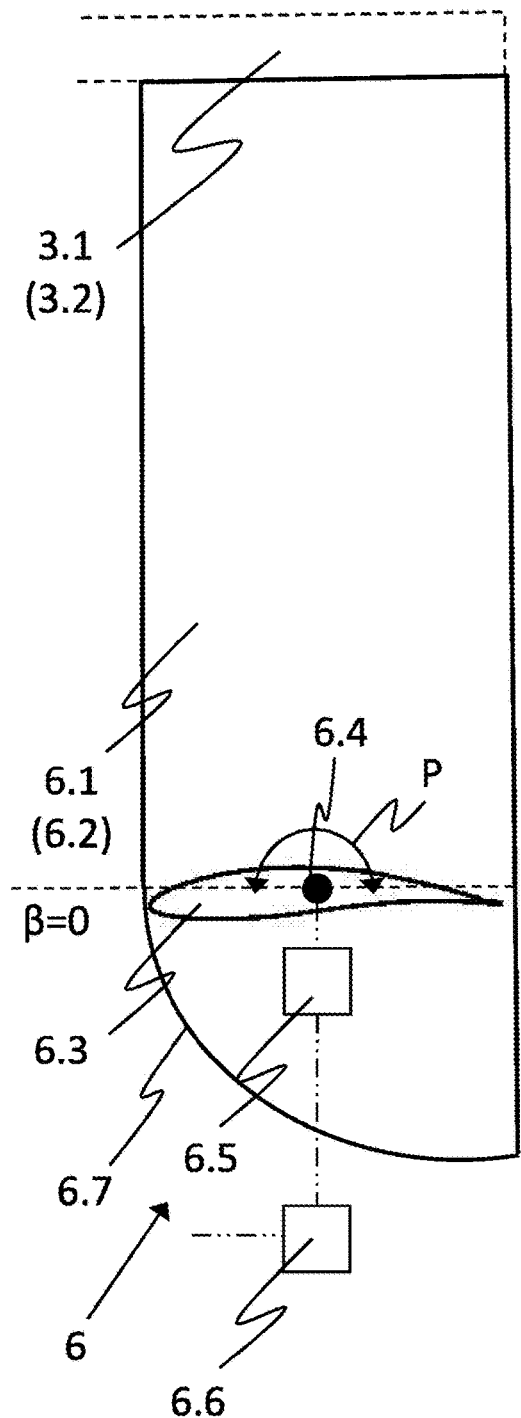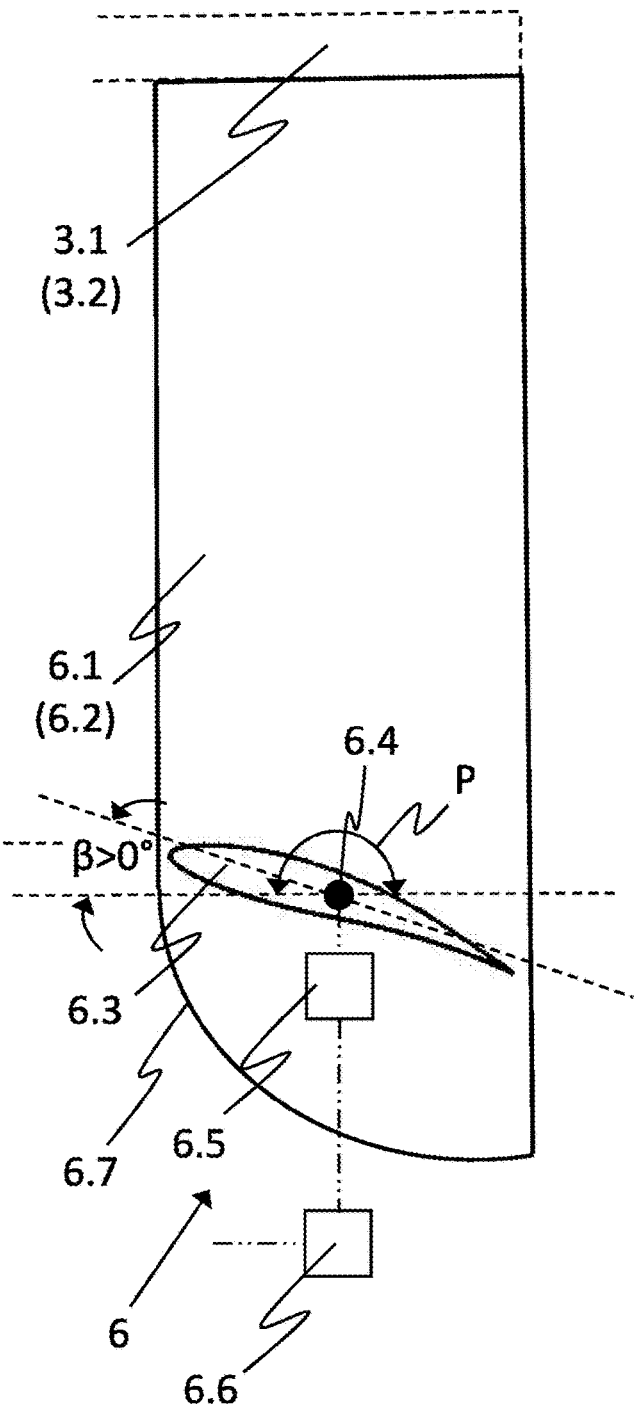

AIRCRAFT

INCORPORATION BY REFERENCE

The following documents are incorporated herein by reference as if fully set forth: German Patent Application No. DE 10 2018 133 171.1, filed Dec. 20, 2018.

TECHNICAL FIELD

The invention relates to an aircraft in the form of an electrically driven, vertical take-off and landing, preferably people-carrying and/or load-carrying multicopter, in which a multiplicity of rotors are arranged on or in a substantially common rotor plane. It is not necessary in this case for said multiplicity of rotors or even for all of the rotors to be arranged exactly in one plane; the present case is also intended for example to comprise application cases in which the rotors further behind are arranged slightly higher (or lower) than those in front.

BACKGROUND

Such an aircraft is known in particular from DE 10 2012 202 698 A1. In terms of flight mechanics, such aircraft achieve a particular feature that the relatively large "blocked surface" formed by the rotor plane gives rise to a resistive force during forward flight that acts considerably above the overall center of gravity of the aircraft. This offset between the overall center of gravity and the point of action of the force results in what is known as a "pitching-up" tilting moment, which leads to the nose of the aircraft moving upward during forward flight. The situation is described in more detail further below with reference to FIGS. 1 and 2, which depict the prior art.

In order to compensate the described tilting moment during forward flight, the rear rotors of the multicopter have to produce more thrust than the front ones. This therefore already has a disadvantageous effect on the one hand because a correspondingly higher electrical energy consumption of said rear rotors is generally linked therewith, such that, under some circumstances, various energy stores (batteries) of the multicopter are discharged at different rates, as a result of which an achievable flight time may be limited.

It is furthermore considered to be disadvantageous in this connection that the rear rotors, which have to generate additional thrust, unlike the front rotors, are subject to an already swirling turbulent flow, as a result of which these rotors, subject to a turbulent flow, provide less thrust at the same rotational speed. This in turn leads to the rear motors having to be operated at an even higher rotational speed in order to compensate said tilting moment, which further amplifies the disadvantageous effect described above. More detailed explanations are also found in this respect in the description of the figures with reference to FIGS. 1 and 2.

SUMMARY

The invention is based generally on the object of improving the flying properties of a generic aircraft.

This object is achieved according to the invention for an aircraft with one or more features of the invention. Advantageous developments of the concept according to the invention are described below and in the claims.

Specifically, the intention is to provide a remedy and compensate the described tilting moment in the generic aircraft without in the process having to resort to relatively inefficiently operating rotors to an increased extent.

According to the invention, an aircraft in the form of an electrically driven, vertical take-off and landing, preferably people-carrying and/or load-carrying multicopter, in which a multiplicity of rotors are arranged in a common rotor plane, is characterized in that a tail unit, protruding downward with respect to the rotor plane, is provided below or above the rotor plane, preferably in a rear region of the aircraft with respect to a forward flying direction.

By virtue of the upwardly or downwardly protruding tail unit mounted in the rotor plane, the discussed problems in terms of flight mechanics of the multicopter are able to be solved, without in the process having to resort to inefficiently operating rotors to an increased extent, especially in the rear region of the aircraft. In this connection, the term "bottom" or "below" means that the tail unit is mounted in the rotor plane counter to an upward movement, generated by the rotors during normal operation, of the aircraft. The term "top" or "above" means that the tail unit is mounted in the rotor plane in the direction of an upward movement, generated by the rotors during normal operation, of the aircraft. Mounting the tail unit above the rotor plane would be more efficient, as there is a completely uninfluenced (laminar) airflow in this region that is not "disrupted" by rotor-induced turbulence.

In the context of a first development of the aircraft according to the invention, there is provision for the tail unit to comprise at least one tailplane. Tailplanes are well known per se from aviation (in the case of aeroplanes). The described tilting moment is able to be compensated particularly easily by providing a tailplane.

In the context of another development of the aircraft according to the invention, there is provision for the tailplane to be arranged inclined by an angle with respect to the rotor plane. Such an angle is also referred to as angle of incidence in aviation. The influence that the tailplane has on the flying movement depends on its value.

In the context of one particularly preferred development of the aircraft according to the invention, there is provision for the tailplane to be designed such that it counteracts a pitching-up tilting moment that is brought about by a blocked surface, generated by the rotors in the rotor plane, during flying operation. This tilting moment has already been indicated further above; it is able to be compensated by the described design of the tailplane without particular rotors of the aircraft having to be loaded to a greater extent for this purpose.

In another development of the aircraft according to the invention, there is provision for a number of rotors, preferably all of the rotors, to have an incline with respect to the rotor plane, preferably an incline of roughly 5°. Such an incline improves the flight properties of the aircraft according to the invention, in particular with regard to a yaw authority.

In order also to additionally improve the yaw stability or lateral stability of the aircraft, there may be provision, in the scope of a further development of the aircraft according to the invention, for the tail unit to comprise at least one vertical stabilizer. This vertical stabilizer is preferably oriented substantially vertically transverse to the rotor plane.

In one particularly advantageous development of the aircraft according to the invention, there may be provision for the at least one vertical stabilizer additionally also to ensure the positioning of the tailplane. To this end, in the scope of a corresponding development of the aircraft according to the invention, there may be provision for the tailplane and the vertical stabilizer to be connected to one another.

In order to achieve a particularly advantageous and stable structure, in the scope of yet another development of the aircraft according to the invention, there may be provision for the tailplane to be arranged between two vertical stabilizers. The invention is in this case however not restricted to a specific number of tailplanes and/or vertical stabilizers.

The vertical stabilizer or vertical stabilizers, in addition to positioning the tailplane, primarily take on the task of improving the yaw stability or lateral stability of the multicopter.

The tailplane is preferably aerodynamically designed such that lift is created during forward flight of the aircraft. In order to counteract the abovementioned "pitching-up" moment, in a corresponding development of the aircraft according to the invention, the tail unit is arranged in a rear region of said aircraft with respect to a forward flying direction. As a result, the rear rotors of the aircraft no longer have to compensate this moment on their own, resulting overall in a more homogeneous distribution of thrust over the multiplicity of rotors. In a corresponding development of the aircraft according to the invention, 18 rotors are preferably used, without the invention being limited thereto.

The lift force $F_L$ created specifically by the tailplane is calculated as described below:

$$F_L = \frac{1}{2} \cdot \rho \cdot v^2 \cdot c_L \cdot A,$$

wherein $\rho$ describes the air density, v describes the air speed (speed above ground minus headwind), $c_L$ describes the lift contribution of the wing (of the tailplane) and A describes the wing surface. It is apparent from said formulaic relationship that the lift force $F_L$ increases quadratically with increasing flying speed. This means that the positive effect of the tailplane becomes particularly pronounced at high flying speeds at which said tilting moment also occurs to a particularly great extent.

In addition to the above-described counteraction with regard to the pitching-up moment, the tailplane, due to its sheer lift effect, relieves all of the rotors or motors to the same extent, as a result of which flying efficiency is improved overall.

In order to achieve an optimal lift effect for different flying speeds or flying movements, one particularly preferred development of the aircraft according to the invention makes provision for at least the tailplane to be designed so as to be adjustable.

A tailplane having flaps may preferably be used in this connection. In the case of such a tail unit, the actual tail unit profile is rigid per se, but a number of adjustable flaps (flaps) are situated behind this in the flying direction, which flaps deflect the outflowing air accordingly depending on their position and thus influence the resultant lift force.

In order to achieve such adjustability in the simplest and most convenient way possible, a corresponding further development of the aircraft according to the invention makes provision for mechanical, in particular motorized means to be present in order to adjust the tail unit, in particular the tailplane or the rudder flaps.

In this connection, the tailplane or the flaps, in a corresponding development of the aircraft according to the invention, is or are preferably mounted so as to be able to pivot about an axis parallel to the rotor plane.

A particularly compact and advantageous design of the aircraft according to the invention arises when the tailplane is mounted so as to be able to be adjusted on the vertical stabilizer or on the vertical stabilizers.

Based on the formulaic relationship described further above, in a corresponding development of the aircraft according to the invention, it has proven to be particularly advantageous for the tailplane or the flaps to be able to be adjusted depending on a flying direction and/or flying speed of the aircraft, in particular automatically by a correspondingly configured flight control unit of the aircraft or in accordance with a pilot command. Said flight control unit of the aircraft advantageously knows the flying direction or flying speed thereof and adjusts the tailplane or the flaps automatically depending thereon. It is however also within the scope of the invention for such an adjustment of the tailplane or of the flaps to be triggered manually by a pilot in the form of a pilot command.

It should in particular be taken into account in this case that, in the case of vertical take-off or landing of the aircraft, the tailplane may have a negative effect on the lift force generated by the rotors as it represents a blocked surface in itself. It may be expedient specifically for this reason to mount the tailplane so as to be able to rotate or pivot, this already having been indicated further above. A servo-motor or the like may in particular be provided for this purpose. It is thereby possible, for virtually any flying speed or flying movement, to set an optimum angle of attack of the tailplane. In the case of vertical take-off or landing of the aircraft or when hovering, the tailplane may furthermore be tilted vertically in order to minimize a blocking effect.

It has proven to be particularly advantageous for the tail unit, in a corresponding development of the aircraft according to the invention, to be attached to at least one support arm, supporting the rotors, of the aircraft.

BRIEF DESCRIPTION OF THE DRAWINGS

Further properties and advantages of the invention become apparent from the following description of exemplary embodiments with reference to the drawings.

FIG. 4 shows a simplified illustration of a section through the tail unit according to FIG. 3;

FIG. 5 shows the tail unit according to FIG. 4 in a changed operating state;

DETAILED DESCRIPTION

Figure 1:
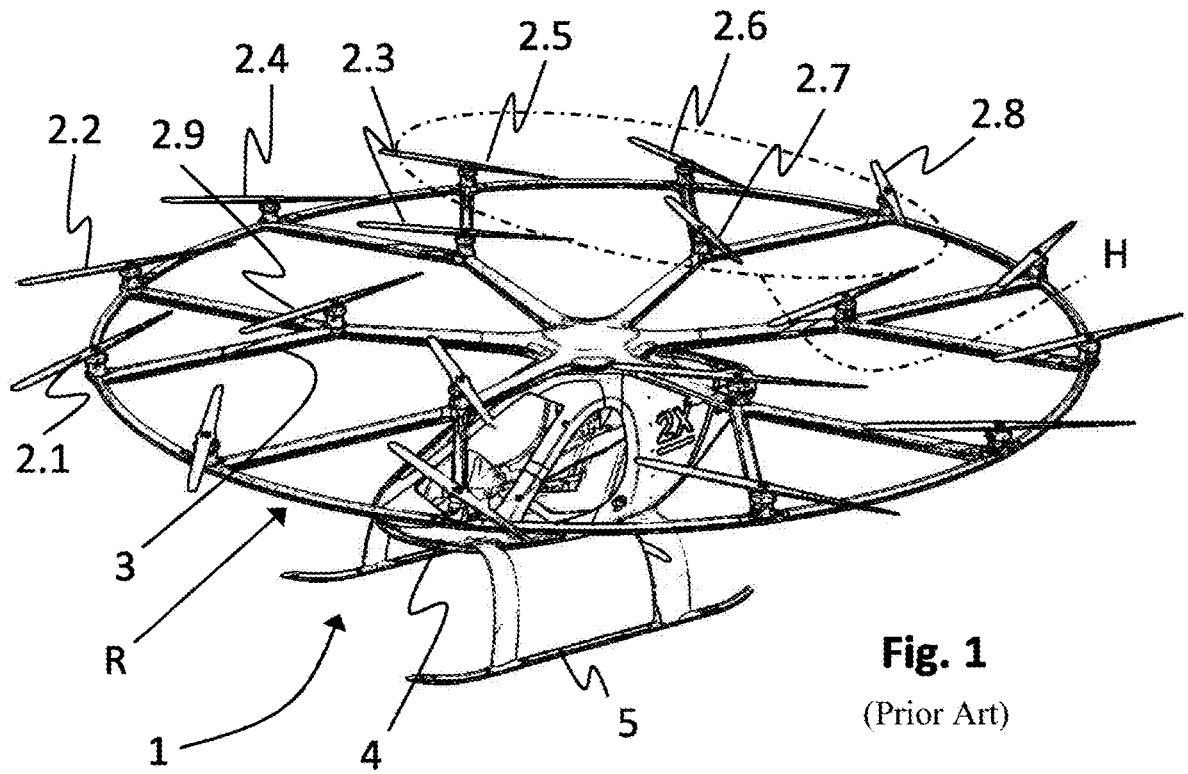
FIG. 1 shows an electrically driven, vertical take-off and landing, people-carrying and/or load-carrying multicopter according to the prior art.

FIG. 1 illustrates an aircraft in the form of an electrically driven, vertical take-off and landing, people-carrying and/or load-carrying multicopter according to the prior art, which aircraft is denoted overall by the reference sign 1. The aircraft or the multicopter 1 has a multiplicity of rotors that are arranged in a substantially common rotor plane. This rotor plane is denoted by reference sign R in FIG. 1. The rotor plane R extends parallel and offset from a plane (not illustrated) that is spanned by support arms of the multicopter 1. Only one of these support arms is explicitly denoted by the reference sign 3 in FIG. 1 for the sake of clarity. The support arms 3 start from a cockpit 4 arranged centrally below the rotor plane R with runners 5 and in particular support the rotors 2.1-2.9, the associated electric motors (not shown in FIG. 1) as well as cables, lines and possibly also the batteries or accumulators assigned to the electric motors, this not being illustrated in more detail in FIG. 1 for the sake of clarity.

It is not necessary in this case for the or even for all of the rotors to be arranged exactly in one plane; the present case is also intended for example to comprise application cases in which—without restriction thereto—the rotors further behind are arranged slightly higher (or lower) than those in front.

According to the design in FIG. 1, the multicopter 1, which is known per se, has a total of 18 rotors, only nine of which are however explicitly denoted by the already mentioned reference signs 2.1-2.9. Since the multicopter 1 is in principle symmetrical on the left and on the right, there are nine corresponding rotors on the other side of the multicopter 1, these not being denoted explicitly in FIG. 1—again for the sake of clarity.

During flying operation of the multicopter 1, it has proven that some of the rotors 2.1-2.9 operate more efficiently than others, which is in particular due to the fact that some of the rotors 2.1-2.9 are subject to a turbulent flow during operation—in particular caused by rotors that are arranged in front of them in the flying direction. This applies in particular to the rotors 2.5-2.8 and the rotor 2.9 that are arranged in a rear region H of the multicopter 1. These rotors 2.5-2.8, 2.9 have reduced efficiencies in comparison with the rotors 2.1-2.4.

Figure 2:
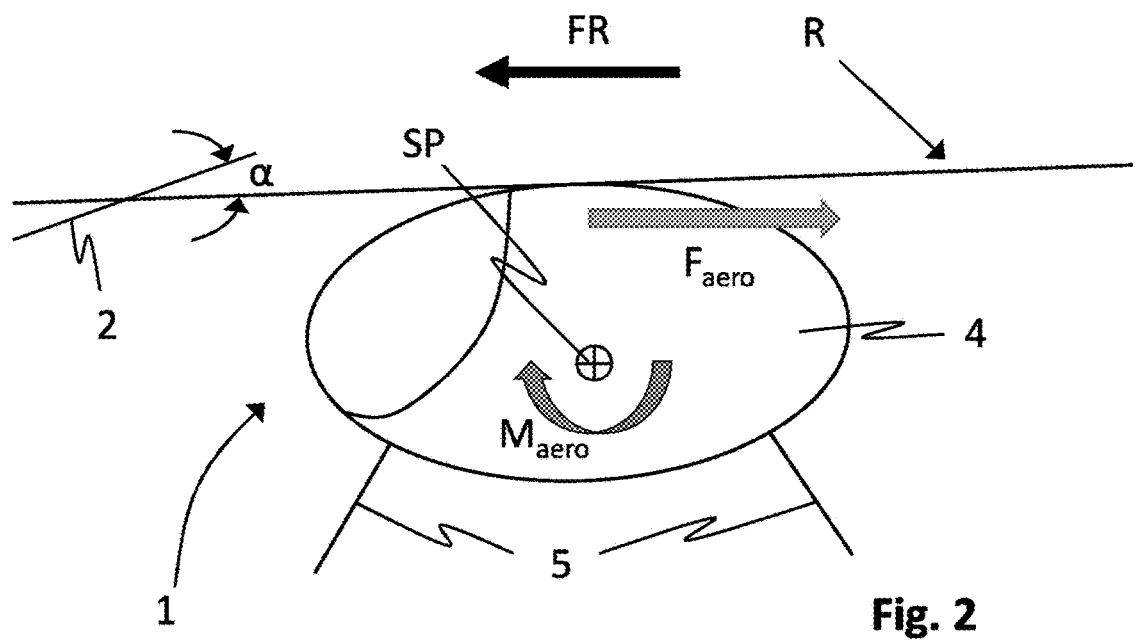
FIG. 2 shows the multicopter according to FIG. 1 in a schematic side view.

FIG. 2 illustrates a further flight mechanics effect known from the prior art that occurs in the case of the shown multicopter 1: The relatively large "blocked surface" that is defined by the rotor plane R results in a force $F_{aero}$, in the case of a flying movement in the flying direction FR according to the arrow in FIG. 2, that acts considerably above the center of gravity, denoted by the reference sign SP in FIG. 2, of the multicopter 1. This gives rise to what is known as a "pitching-up" tilting moment, this being denoted by the reference sign $M_{aero}$ in FIG. 2. During flying operation, this leads to the nose of the multicopter tending to move upward. In order to compensate the pitching-up tilting moment $M_{aero}$ during forward flight FR, the rear rotors (cf. reference sign H in FIG. 1) have to generate more thrust than the front ones. In connection with the already discussed fact that the rear rotors, unlike the front ones, are subject to an already swirling turbulent flow, this thus results in a greatly reduced efficiency, especially of the rear rotors 2.5-2.8 (cf. FIG. 1) during forward flight.

FIG. 2 also schematically indicates, with reference to a single depicted rotor 2, that the rotors have a slight incline $\alpha \approx 5°$ with respect to the rotor plane R. This leads to a situation whereby the multicopter 1—due to the relatively small angle—has a low yaw authority.

Figure 3:
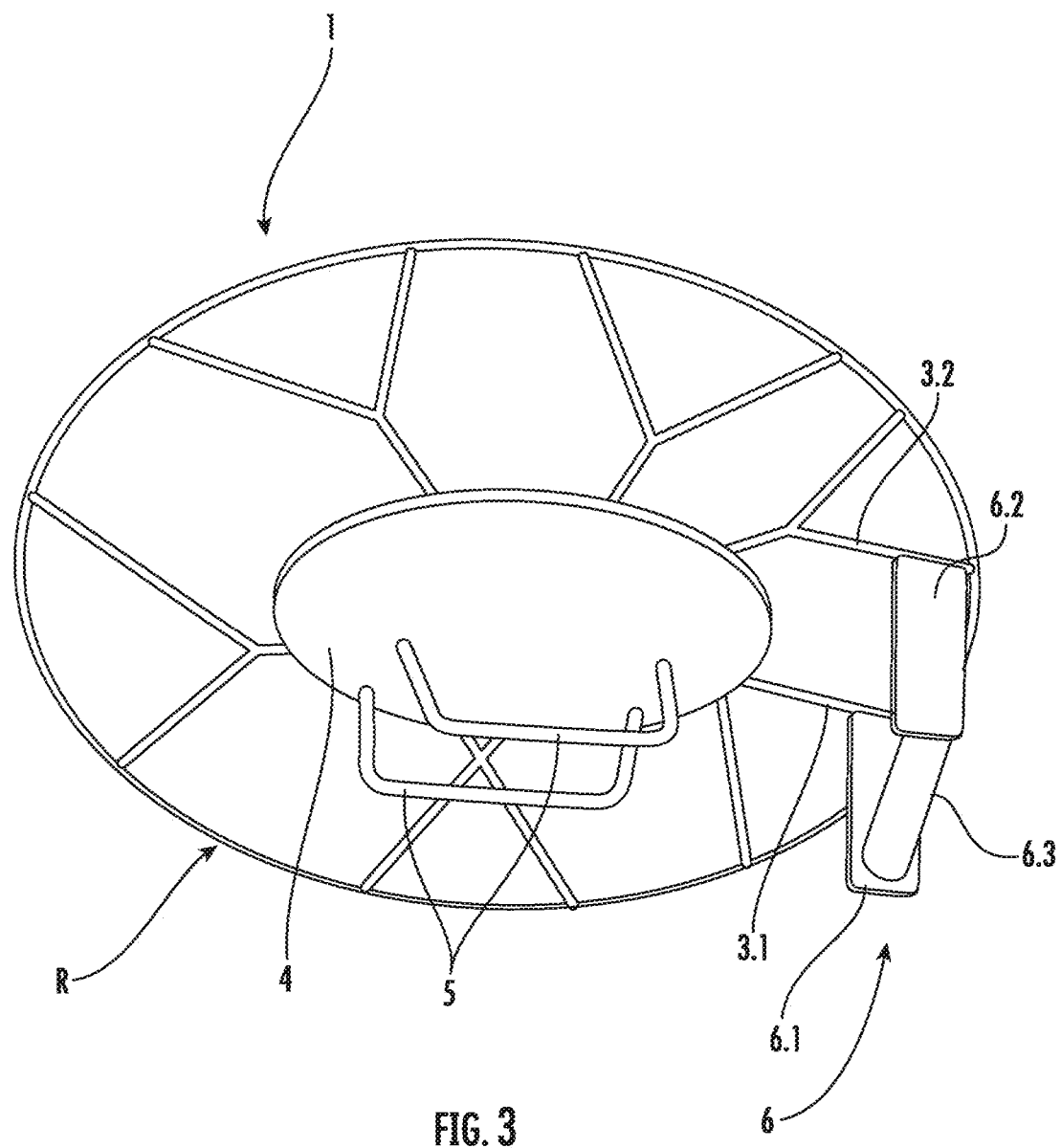
FIG. 3 shows a simplified inclined illustration from below of an aircraft according to the invention having a tail unit.

FIG. 3 now illustrates an aircraft, developed according to the invention, in the form of an electrically driven, vertical take-off and landing, people-carrying and/or load-carrying multicopter 1. Here and below, identical reference signs denote identical or at least functionally identical elements. The rotors are not illustrated in FIG. 3 for the sake of clarity.

In order to compensate the above-described reduced efficiency of some of the rotors and also to counteract the discussed low yaw authority of the multicopter 1, a tail unit 6 that is arranged below the rotor plane R and protrudes downward with respect to this rotor plane R is provided. The tail unit 6 in this case protrudes downward at substantially a right angle from the rotor plane R, as is readily able to be seen from the illustration in FIG. 3. The tail unit 6 comprises two vertical stabilizers 6.1, 6.2, between which a tailplane 6.3 is arranged. This is discussed in even more detail further below. The two vertical stabilizers 6.1, 6.2 are arranged on a respective support arm 3.1, 3.2 of the multicopter 1 (cf. FIG. 1 and associated description). More precisely, the two vertical stabilizers 6.1, 6.2 protrude vertically downward with respect to the rotor plane R or the support arms 3.1, 3.2, whereas the tailplane 6.3 connects the two vertical stabilizers 6.1, 6.2 and may in this case in particular be arranged roughly parallel to the rotor plane R. This is likewise discussed in even more detail further below.

It may generally be assumed that the tailplane 6.3 is arranged so as to be inclined at an angle with respect to the rotor plane R, which angle is not depicted in FIG. 3 for the sake of illustration and is denoted ß in following FIGS. 4 to 7. It has already been indicated that the angle ß may adopt the value 0, but it is however not restricted to this value, as will become clear further below.

FIG. 4 illustrates a section through the tail unit 6 according to FIG. 3, wherein the section plane is selected such that the tailplane 6.3 is illustrated in cross section. This cross section is selected in line with a suitable aerodynamic profile, such as for example a profile from the NACA series. The tailplane 6.3 is mounted so as to be able to rotate or pivot about an axis 6.4, this being symbolized by a double-headed arrow P in FIGS. 4 to 7.

In the exemplary embodiment that is shown, motorized means 6.5 that are designed and intended to rotate or pivot the tailplane 6.3 are provided. The motorized means 6.5 may be for example a servo-motor or the like. Reference sign 6.6 denotes a superordinate control device for the motorized means 6.5 for adjusting the tailplane 6.3. The dot-and-dash lines symbolize corresponding (control-based) active connections. The control unit 6.6 receives control commands in particular from a superordinate flight control unit of the multicopter or in accordance with a pilot command, this only being indicated in the Figures by a (horizontal) dot-and-dash line going away from reference sign 6.6. The vertical stabilizers 6.1, 6.2 have a substantially rectangular design in the side view that is shown, but may have a rounding 6.7 at their lower front edge, as illustrated. The shape of the vertical stabilizers may however adopt any shape known to those skilled in the art, and may in particular be trapezoidal, arrow-shaped or teardrop-shaped.

The invention is not restricted to the presence of the described motorized means. Instead of this (or as a safety measure), a passive return element may also be provided, such as for example a spring, by way of which the tailplane is moved into a vertical position (neutral position) by the return element when hovering (without a head-on flow); the profile is then set so as to be "in the wind" depending on the head-on flow speed.

FIG. 4 shows an operating state in which the tailplane is arranged at an angle ß=0°. The angle ß is referred to as angle of incidence (angle between tailplane and fuselage longitudinal axis of an aircraft). By virtue of the angle of incidence ß, it is possible—depending on the flying speed or air speed (speed above ground+headwind)—to compensate the torque $M_{aero}$ described further above with reference to FIG. 2 specifically in the ideal case, this contributing to improved rotor efficiency.

FIG. 5 shows another operating state of the tail unit 6 according to FIG. 4 in which the angle of incidence ß differs from 0 (ß>0). As already described, this is achieved by rotating or pivoting the tailplane 6.3 about the axis 6.4 in accordance with the double-headed arrow P, for example in accordance with the motorized means 6.5 or the controller 6.6. The tailplane 6.3 is advantageously adjusted automatically depending on a flying direction and/or flying speed of the multicopter by corresponding control commands from the flight control unit (not illustrated).

Figure 6:
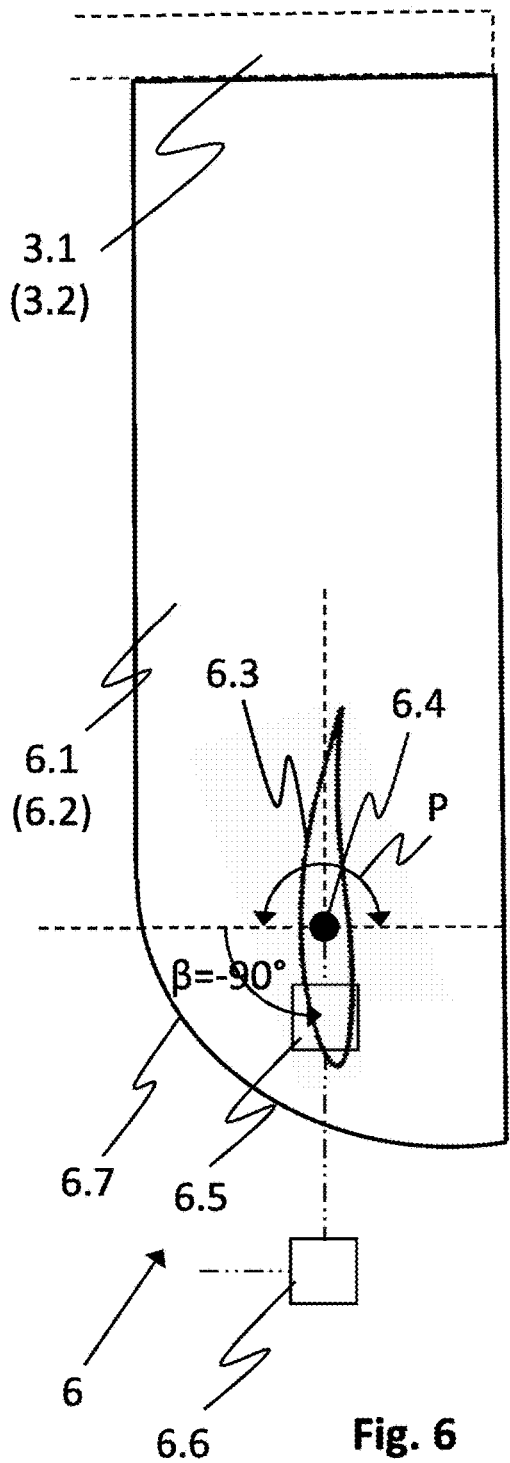
FIG. 6 shows the tail unit according to FIG. 4 in a further changed operating state.
Figure 7:
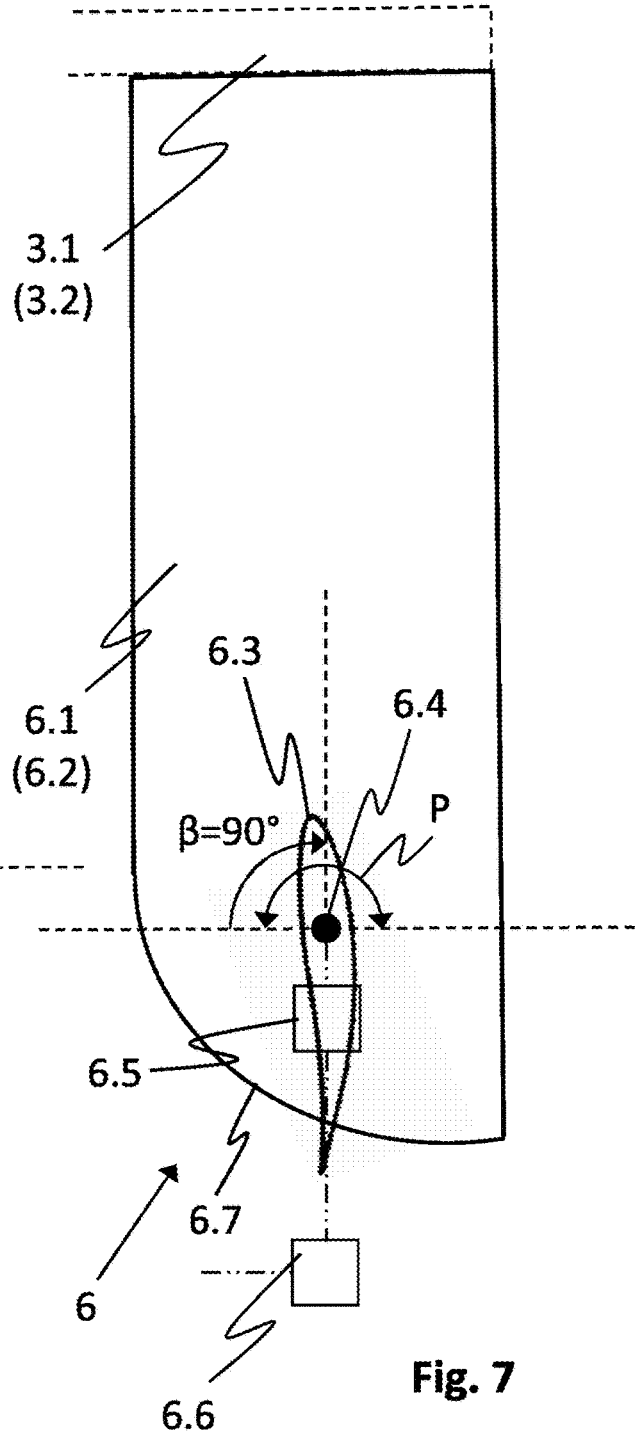
FIG. 7 shows the tail unit according to FIG. 4 in yet another operating state.

In order not to hinder the corresponding upward or downward movement during vertical take-off and landing of the multicopter, the tailplane 6.3 according to FIGS. 6 and 7 may also adopt angles of incidence ß of −90° or +270° (FIG. 6) and +90° (FIG. 7). FIG. 6 specifically illustrates one preferred position of the tailplane 6.3 during vertical descending flight of the multicopter, whereas FIG. 7 shows a preferred position of the tailplane 6.3 during vertical ascending flight of the multicopter.

Any desired intermediate positions between the angles of incidence ß according to FIGS. 4 to 7 are obviously also possible.

Figure 8:
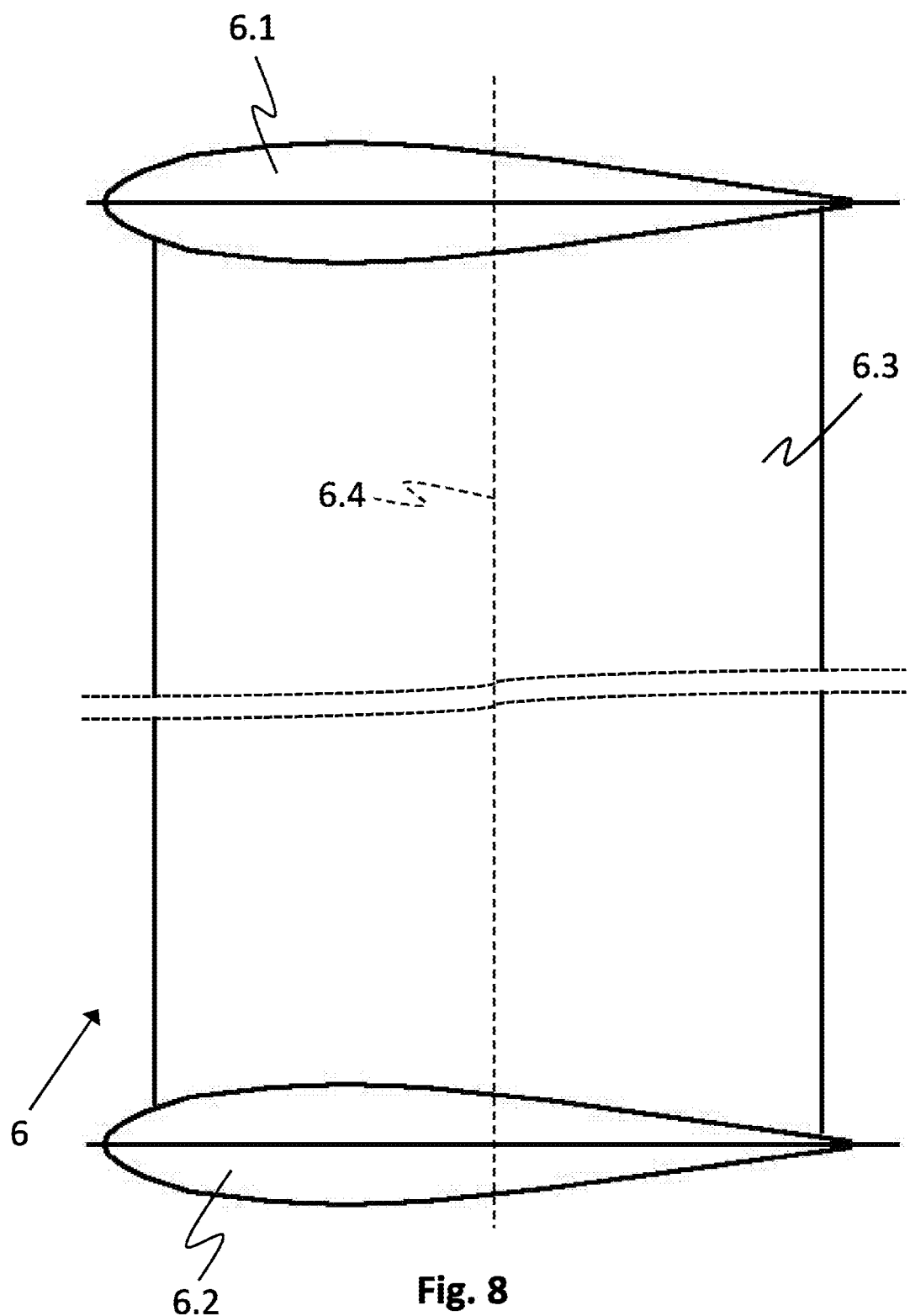
FIG. 8 shows a further section through the tail unit according to FIG. 3, wherein the section plane is oriented perpendicular to that in FIGS. 4 to 7.

FIG. 8 finally shows a plan view onto the tailplane 6.3, wherein the two vertical stabilizers 6.1, 6.2 are illustrated in cross section. The vertical stabilizers 6.1, 6.2 preferably have a suitable aerodynamic profile, as illustrated by way of example, without the invention being restricted thereto.

Figure 9:
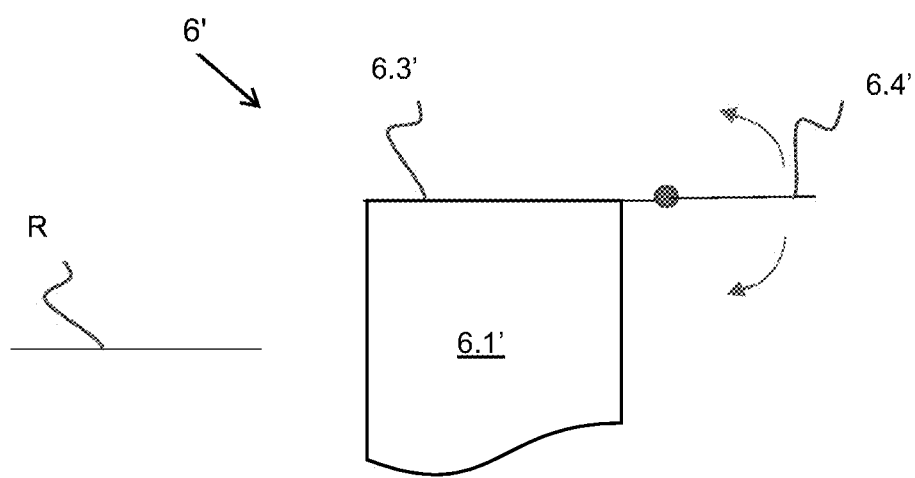
FIG. 9 shows a simplified schematic view of a tail unit with a tailplane arranged above the rotor plane and having a fixed tail unit with a number of flaps.

Referring to FIG. 9, an alternate embodiment of the tail unit 6' is schematically shown. Here, the tail unit 6' protrudes upward with respect to the rotor plane R via vertical stabilizer 6.1'. Additionally, as schematically illustrated, the tailplane has a fixed tail unit profile 6.3' that is rigid, and a number of the r flaps 6.4' are provided behind the fixed tail unit profile 6.3' in the flying direction, with the flaps 6.4' being configured to deflect outflowing air depending on their position (indicated via the arrows).

As is easily recognized by a person skilled in the art, tail units having a number of tailplanes or vertical stabilizers different from that illustrated by way of example and illustratively in the present case may of course also be used. It is in particular within the scope of the invention to arrange more than one tailplane between two vertical stabilizers, as shown. It is furthermore within the scope of the invention to arrange two tailplanes in each case laterally on a common vertical stabilizer, similarly to in the case of conventional aeroplanes. The number of tailplanes is in this case not limited in principle to two.

The tail unit is preferably attached to said support arm by way of the vertical stabilizer. If a plurality of vertical stabilizers are present, each of these vertical stabilizers may be attached to a dedicated support arm.

The invention claimed is:

1. An aircraft (1) comprising:
   an electrically driven, vertical take-off and landing, multicopter, including a multiplicity of rotors (2.1-2.9) arranged in a substantially common rotor plane (R),
   a tail unit (6), protruding downward with respect to the rotor plane (R) and located below the rotor plane (R), in a rear region of the aircraft (1) with respect to a forward flying direction (FR), and
   the tail unit (6) comprises two vertical stabilizers (6.1, 6.2) that extend downward from support arms (3.1, 3.2) that each support at least one of the rotors, a tailplane (6.3) connected between the two vertical stabilizers (6.1, 6.2), and the tailplane (6.3) is located below the support arms.

2. The aircraft (1) as claimed in claim 1, wherein the tailplane (6.3) is configured to counteract a pitching-up tilting moment ($M_{aero}$) that is brought about by a blocked surface, generated by the rotors (2.1-2.9) in the rotor plane (R), during flying operation.

3. The aircraft (1) as claimed in claim 1, wherein at least two of the multiplicity of rotors (2.1 to 2.9) have an incline (α) with respect to the rotor plane (R).

4. The aircraft (1) as claimed in claim 1, wherein the at least one tail unit (6) is at least partly adjustable.

5. The aircraft (1) as claimed in claim 4, wherein the tailplane has flaps and a fixed tail unit profile that is rigid, and a number of the flaps are provided behind the fixed tail unit profile in the flying direction, said flaps being configured to deflect outflowing air depending on their position.

6. The aircraft (1) as claimed in claim 5, further comprising a motor (6.5) configured to adjust at least one of the tailplane (6.3) or the flaps during the flight.

7. The aircraft (1) as claimed in claim 6, wherein at least one of the tailplane (6.3) or the flaps are mounted so as to be able to pivot about an axis (6.4) parallel to the rotor plane (R).

8. The aircraft (1) as claimed in claim 7, wherein the tailplane (6.3) is mounted so as to be adjustable on the vertical stabilizers (6.1, 6.2).

9. The aircraft (1) as claimed in claim 5, wherein at least one of the tailplane (6.3) or the flaps are adjustable depending on at least one of a flying direction (FR) or flying speed of the aircraft (1).

10. The aircraft (1) as claimed in claim 9, further comprising a flight control unit (6.6) configured for adjustment of the tailplane (6.3) or the flaps in accordance with a pilot command.

11. The aircraft (1) as claimed in claim 10, wherein the tail unit (6) is attached to at least one support arm (3.1, 3.2), supporting the rotors (2.1-2.9), of the aircraft (1), via the vertical stabilizers (6.1, 6.2).

* * * * *